C. HERRINGER.
DETECTOR BAR.
APPLICATION FILED FEB. 28, 1908.
902,580.
Patented Nov. 3, 1908.
2 SHEETS—SHEET 1.
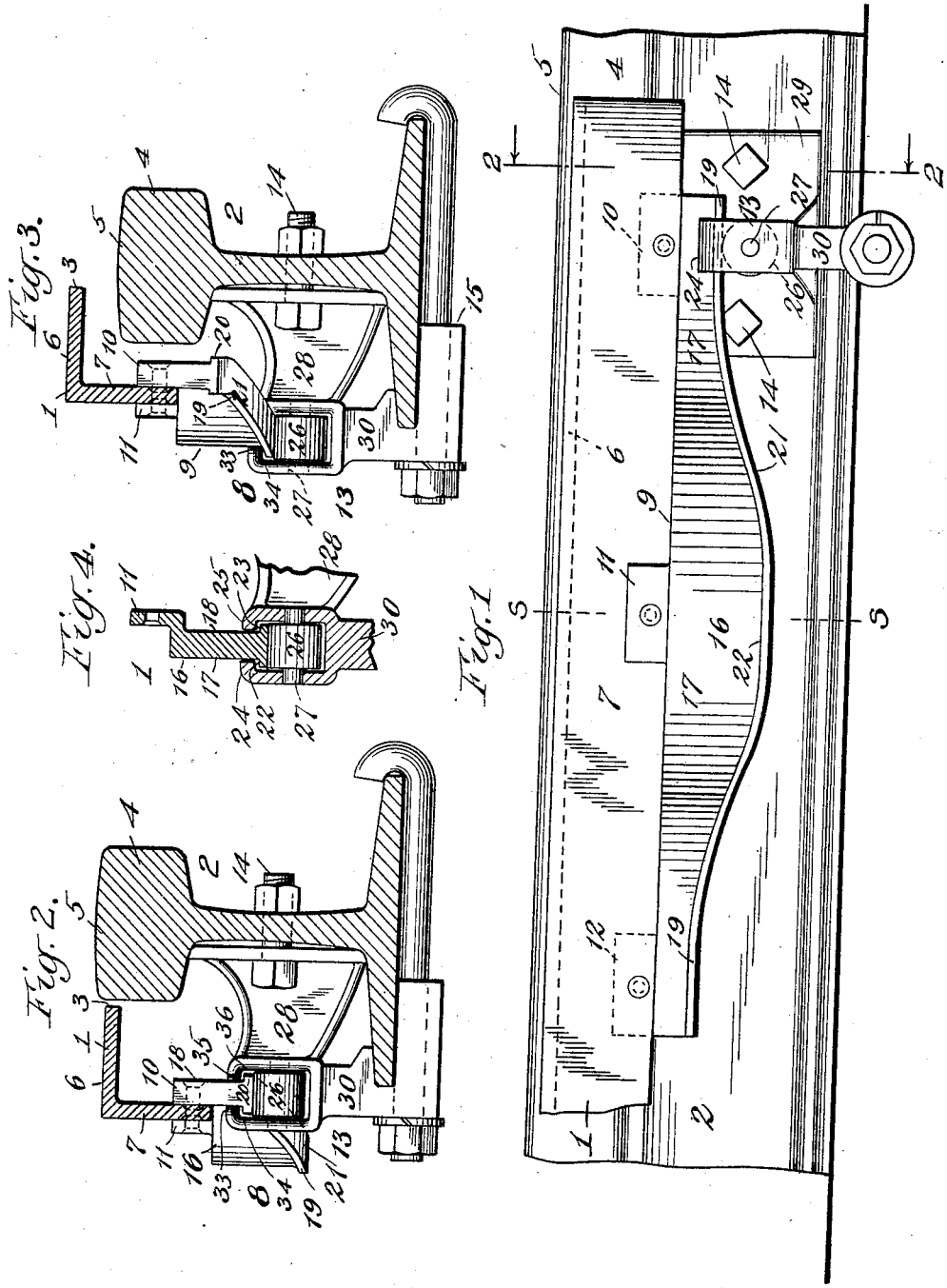
WITNESSES:
INVENTOR.
Casper Herringer
BY
HIS ATTORNEY.

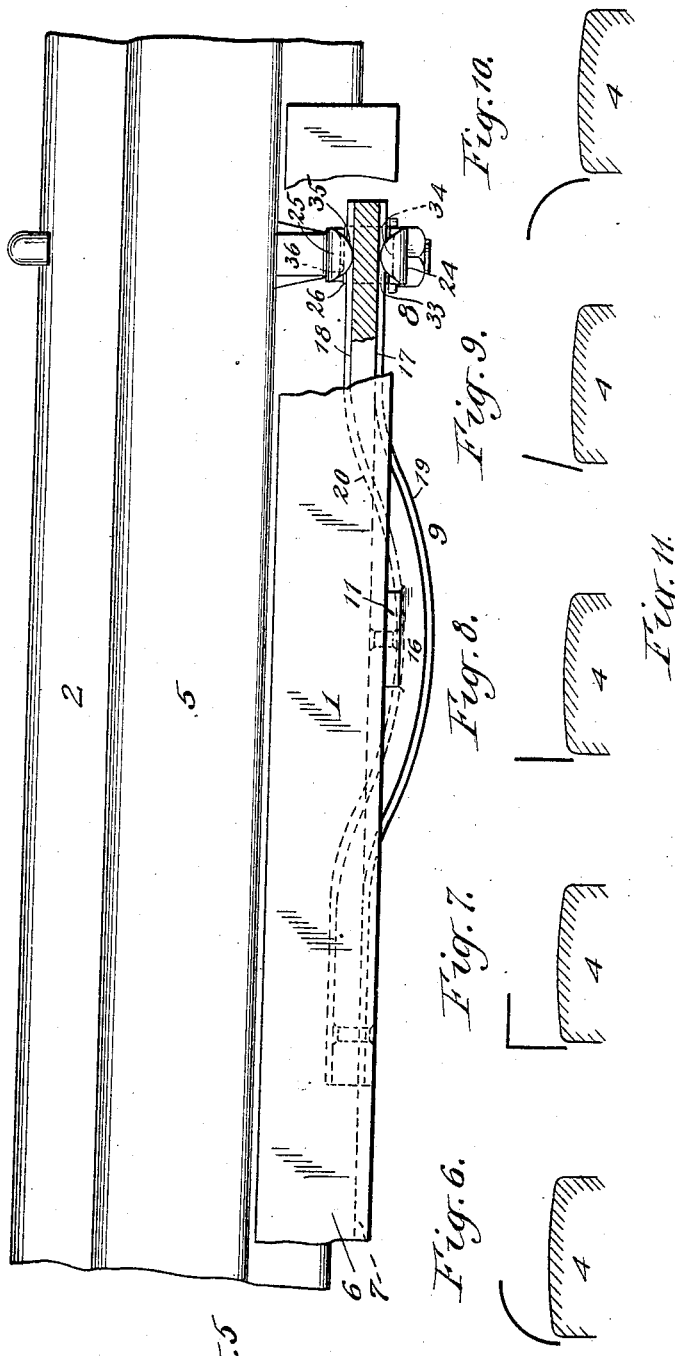
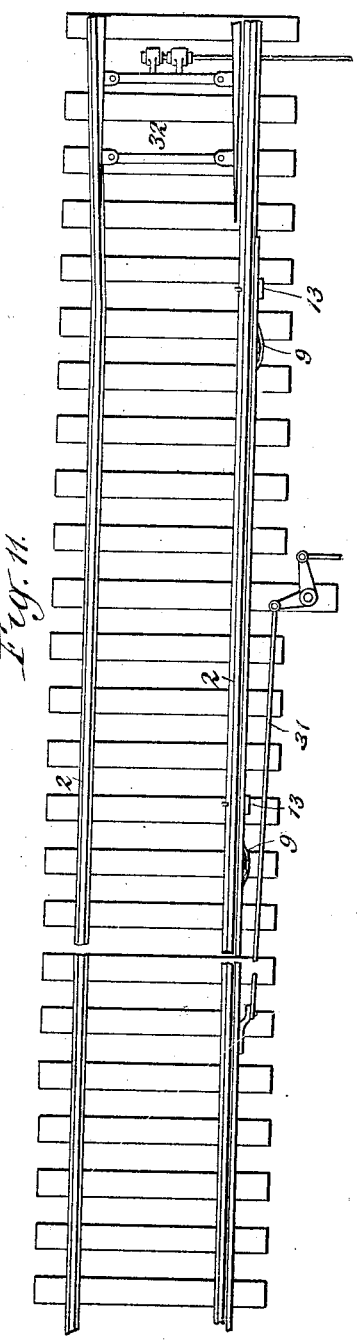

UNITED STATES PATENT OFFICE.

CASPER HERRINGER, OF NEW YORK, N. Y., ASSIGNOR, BY MESNE ASSIGNMENTS, TO THE FEDERAL SIGNAL COMPANY, A CORPORATION OF NEW YORK.

DETECTOR-BAR.

No. 902,580.

Specification of Letters Patent.

Patented Nov. 3, 1908.

Application filed February 28, 1908. Serial No. 418,253.

*To all whom it may concern:*

Be it known that I, CASPER HERRINGER, a citizen of the United States, and a resident of the borough of Brooklyn, county of Kings, city and State of New York, have invented certain new and useful Improvements in Detector-Bars, of which the following is a specification.

This invention relates to detector bars for use on railways.

The invention seeks to provide a construction and arrangement more efficient and reliable than those heretofore in use.

In the present invention, a new movement is given to the detector bar essentially different from the movement of the detector bars heretofore in use. By means of this new and different movement, the lack of reliability which has been found to characterize detector bars, heretofore used, is effectually overcome.

Instead of relying upon a uni-direction movement of a detector bar, for example, a movement in an upward direction to engage the tread of a wheel or a lateral movement to engage the side face of a wheel and thereby give a detection, the present invention contemplates a multi-direction movement of the engaging edge of the detector bar transverse to the length of the rail. This engaging edge of the detector bar is thereby moved into two detecting positions by the multi-direction movement. One detecting position results from an upward movement of the detector bar whereby the engaging edge of the same is moved into position to engage the tread of a wheel, provided the tread of a wheel extends out beyond the head of the rail across this upward path of said edge. In case the tread of the wheel does not so extend, which is many times the case due to many causes and which has occasioned a lack of reliability in detector bars of the prior art, a continued movement of the detector bar, according to this invention, elevates the same above the head of the rail and then its movement is directed inwardly into position to engage the side face of the wheel. Thus, in order that an unchecked movement of applicant's detector bar may take place, it must move from a normal position into two detecting positions without engaging the wheel and then return to a normal position.

More particularly, this invention relates to the herein disclosed embodiment of guiding means for effecting the above described movement of a detector bar and also applies to a guiding means comprising a camway member secured to the detector bar and a follower member fixed in position.

It is also to be understood that this invention contemplates a longitudinal movement of the detector bar relatively to the rail simultaneously with its transverse movement. But it is to be understood that this invention is not limited to a detector bar necessarily having a longitudinal movement. Furthermore, it is to be understood that the cam faces provided by the camway member, although preferably disposed as illustrated in the accompanying drawings and described below, may be variously disposed and exist in a greater or less number than as shown and described, all within the scope of the accompanying claims.

Reference is to be had to the accompanying drawings forming part of this application, in which like numerals designate corresponding parts in the several figures, and in which,—

Figure 1 is a side elevation showing a detector bar and its guiding mechanism positioned on the outside of a rail with the detector bar in a normal position; Fig. 2 is a transverse section through line 2—2 of Fig. 1 looking in the direction of the arrows; Fig. 3 is a similar section to that shown in Fig. 2 but showing the detector bar with its camway member in mid-position or extreme detecting position for the bar; Fig. 4 is a detail transverse section taken through the follower member and with the parts as shown in Fig. 3; Fig. 5 is a plan with parts broken away showing the mechanism as illustrated in Fig. 1; Fig. 6 is a diagram indicating the projection upon a transverse vertical plane, of the path of the engaging edge of the detector bar when its transverse movement is over a curved path; Fig. 7 is a similar diagram for a two direction movement; Fig. 8 is a similar diagram for a straight up movement of the engaging edge of a detector bar of the prior art; Fig. 9 is a similar diagram for a similar slightly inclined uni-direction movement of the engaging edge of a detector bar of the prior art; Fig. 10 is a similar diagram for an outwardly inclined curved movement of the engaging edge of a detector bar of the prior art, the detector bar having only one detecting position; and Fig. 11 is a diagram indicating a switch and a length of the track, one rail of which is provided with a detector bar in accordance with the present invention.

Referring now more in detail to the drawings, 1 designates a detector bar lying in a normal position outside of the rail 2 with its wheel engaging edge 3 preferably in close proximity to the side of the rail head 4 and slightly below the tread 5. The detector bar 1 may be of any well known construction but, in a preferred form, it is that shown in the drawings,—an angle-bar comprising an inwardly extending horizontal flange 6 and a vertical flange 7.

Certain guiding means is provided for effecting an upward and inward multi-direction movement of the edge 3 transverse to the rail 2. This means for guiding is designated in its entirety in its present embodiment by the numeral 8, and may be best understood from Figs. 1 to 5 inclusive.

In the embodiment shown in the drawings, this guiding means comprises two principal parts, the camway member 9 preferably secured to the detector bar 1, as by lugs 10, 11 and 12 riveted directly to the flange 7, and may be regarded as made up of different portions, and the follower member 13 fixed in position, which may be accomplished by securing the same to the rail 2 by means of the web bolts 14 or by means of the clip 15 or by both as indicated in the drawings.

The camway member provides a web portion 16 bounded by surfaces 17 and 18, the elements of which are all preferably vertical lines and which surfaces constitute cam faces and are inclined away from a vertical plane parallel to the length of the rail and then towards said plane and so as preferably to be symmetrically arranged on opposite sides of the plane indicated in Fig. 1 by the line S—S. One edge of the web 16 terminates in two side flanges the vertical edges 19 and 20 of which constitute cam faces which are substantially parallel to the faces 17 and 18 while the exposed surface 21 of the flange portion provides a cam face inclined from a horizontal plane and preferably symmetrically on each side of the plane S—S. The opposite faces 22 and 23 of the flanges 19 and 20 correspond to the face 21 in general direction. It is thus evident that a section of the camway member is T-shaped and, as shown in the drawings, is that of an inverted T, see particularly Fig. 4.

The follower member 13 comprises a yoke, the arms 24 and 25 of which embrace the flanges of the camway member and coöperate therewith. This yoke provides surfaces coöperating with the cam faces of the camway member and the inturned ends of arms 24 and 25 prevent misplacement of the detector bar. It is preferred that each of these surfaces be beveled as indicated in the drawings. Although the beveled surface 26 is shown to be the cylindrical surface of an antifriction roller supported in the yoke by the pin 27, it is to be understood that this surface need not be upon a rotating part, as indicated, if the same is not desired, also that other beveled surfaces may be those of similar rollers.

It is to be understood that the follower member is preferably so designed that its inner surfaces may loosely engage with any of the cam faces of the camway member and permit a relative parallel movement between the camway member and the follower member while preventing a tilting of the detector bar 1 in its travel from a normal to either of its detecting positions.

28 indicates a bracket arm extending outwardly from the plate 29 which is fixed in position by the bolts 14 while 30 indicates an arm upwardly extending from the clip 15.

In their preferred construction, the camway member and the follower member may be both formed of cast iron.

It is to be understood that the corresponding opposite cam faces of the camway member 9, such as 17 and 18; 22 and 21; and 23 and 21, although substantially parallel, should not be formed exactly parallel since they must conform to the laws governing the construction of cams. It is desirable that the vertical dimension between overlying cam faces of the flanges remain constant and that the horizontal dimension between the cam faces 17, 18 and 19, 20 remain constant.

The detector bar 1 may be installed in accordance with applicant's invention and as indicated in Fig. 11. Two or more guiding means 9 may be employed, two being illustrated in Fig. 11. 31 designates a connecting rod secured to the detector bar and it may be interlocked with the switch 32 in any manner well known in the art so that the switch 32 cannot be shifted when the wheels of a train are present upon the rail 2. The rod 31 serves to move the detector bar longitudinally.

Operation: To operate the detector bar 1, a longitudinal movement is applied to the detector bar tending to cause it to move to the right from the normal position shown in Fig. 1. It is preferable that the first small portion of the longitudinal movement of the detector bar cause no appreciable movement of the detector bar transverse to the rail 1. This is accomplished by providing either no or almost no inclination away from horizontal and vertical planes respectively for the respective cam faces of the camway at the right of Fig. 1, as shown. As the longitudinal movement of the detector bar progresses, the cam face 21 rides up on the roller surface 26 elevating the detector bar so that the edge 3 is moved into position to engage the tread of the wheel,—one detecting position. In case the tread of the wheel does not extend outwardly beyond the head of the rail 5, the surface 21 continues to ride up on the roller surface 26, still further elevating the edge 3 of the detector bar. Then after the edge 3 has cleared the head of the rail 2, the inside surface 33 or 34 or both of the yoke arm 24 engaging the vertical cam surface 17 or 19 or both, force the camway member inwardly and likewise force the engaging edge 3 of the detector bar inwardly into position to engage the side face of the wheel provided a wheel is present upon the head 4,—a second detecting position. If no wheel is present, a movement of the detector bar continues until the cam faces have forced the detector bar into the position illustrated in Fig. 3. This is the mid position for the camway member or the extreme detecting position for the detector bar. It is preferable that the detector bar have a longitudinal movement in the vicinity of its extreme detecting position of some extent which does not occasion any appreciable transverse movement of the detector bar relative to the rail. This may be accomplished by decreasing the inclination of the cam faces in this locality or by reducing it to zero if so desired, as shown in the figures.

With some track mechanisms a complete movement of the detector bar occasions a continued movement from a normal position such as that shown in Fig. 1 and in the same direction through both detecting positions into a second normal position so that the lug 12 is shifted so as to lie adjacent the follower member 13, the same as the lug 10 is located adjacent the follower member 13 in Fig. 1. In this complete movement, the movement from extreme detecting position to a second normal position is usually effected by the weight of the detector bar causing the camway member 19 to slide down with its cam face 21 engaging the roller surface 26, the inward face 35 or 36 or both of the yoke arm 25 engaging the vertical cam face 18 or 20 or both first causing an outward movement of the detector bar. It is to be understood that it is preferable that the camway member 9 be symmetrical about the plane S—S.

It is preferable, in some track mechanisms, that the return movement from extreme detecting position to normal position be a backward movement from the extreme detecting position shown in Fig. 3 to the position shown in Fig. 1, then the camway member rolls down over the roller surface 26 with the same portion of the cam face 21 in engagement therewith as was in engagement therewith on the upward movement, the cam face 18 or 20 or both first causing an outward movement of the detector bar however. It is to be understood that any tendency to tilt may be overcome by the locking engagement of the inturned ends of the arms 24 and 25 engaging the coöperating cam faces 22 and 23. This arrangement prevents misplacement of the detector bar as by malicious persons.

In case gravity is insufficient to return the detector bar to normal position, either one or both of the cam faces 22 and 23 may coöperate positively to depress the detector bar to either of its normal positions. Although, a camway member symmetrical about a line S—S has been illustrated, it is to be understood that one comprising substantially one of the symmetrical halves of that illustrated would be useful, in which case either the lugs 10 and 11 or the lugs 11 and 12 would be sufficient to secure this half member to the detector bar.

In the accompanying drawings, it is to be understood that the cam faces, referred to, do not necessarily include continuous cam faces disposed as illustrated in the drawings. Cam faces essential to the movements specified in the claims are alone to be read as limiting construction and may be located on separate portions. Furthermore, the engaging faces of the follower member may be variously disposed and it is contemplated that the roller surface 26 may be differently rotated, if desired, all within the scope of the following claims.

What is claimed and what is desired to be secured by United States Letters Patent is:—

1. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a portion providing a cam face secured to said detector bar to move therewith, and said means also comprising a follower part fixed in position for operatively engaging said cam face.

2. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising means for imparting an upward movement to said edge and means for imparting a subsequent inward movement to said edge, one of said last two means comprising a portion providing a cam face secured to said detector bar to move therewith, and said means also comprising a follower part fixed in position for operatively engaging said cam face.

3. In combination, a detector bar for railway rails, said detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding having two angularly disposed transverse acting cam faces at least one of which is formed on a portion secured to and moving with the detector bar and said means also comprising a follower part for operatively engaging each cam face.

4. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a portion secured to the detector bar and providing a transverse acting cam face and a portion also secured to the detector bar and providing a second transverse acting cam face angularly disposed relatively to said first cam face and a part for operatively engaging each of said cam faces.

5. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a portion secured to the detector bar and providing a transverse acting cam face and a portion also secured to the detector bar and providing a second transverse acting cam face angularly disposed relatively to said first cam face and a part for operatively engaging each of said cam faces; and a third cam face being provided for returning said detector bar from a detecting position towards a normal position.

6. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a portion secured to the detector bar and providing a transverse acting cam face and a portion also secured to the detector bar and providing a second transverse acting cam face angularly disposed relatively to said first cam face and a part for operatively engaging each of said cam faces; and two other cam faces being provided corresponding to but oppositely arranged with respect to said first two cam faces and operative in returning said detector bar from a detecting position towards a normal position.

7. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a camway member secured to the detector bar and a follower member fixed in position, said camway member having two angularly disposed transverse acting cam faces and said follower member having parts for operatively engaging said cam faces respectively.

8. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a camway member secured to the detector bar and a follower member fixed in position, said camway member having a downwardly inclined bottom cam face and an outwardly inclined side cam face, and said follower member having parts for operatively engaging said cam faces.

9. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a camway member secured to the detector bar and a follower member fixed in position, said camway member having a bottom cam face inclined downwardly from the detector bar for effecting an upward movement of the bar and then inclined upwardly towards the detector bar for guiding the downward return movement of said bar, an outwardly facing cam face inclined outwardly away from the railway rail for effecting an inward movement of said bar, and a cam face inwardly inclined toward said rail for effecting an outward return movement of said detector bar, and said follower member having parts for operatively engaging said cam faces.

10. In combination, a detector bar having longitudinal and transverse movement relative to the rail; means for guiding said movement comprising a camway member and a follower member, one of which members is secured to the detector bar and the other of which is fixed in position, said camway member comprising a flanged cam face portion having a T cross section and providing cam faces similarly inclined from the length of the rail, and said follower member comprising a yoke for embracing the flanges of said camway member and providing surfaces for engaging the cam faces of said camway member whereby said detector bar is guided positively from and towards normal position.

11. In combination, a detector bar having longitudinal and transverse movement relative to the rail; means for guiding said movement comprising a camway member and a follower member, one of which members is secured to the detector bar and the other of which is fixed in position, said camway member comprising a flanged cam face portion having a T cross section and providing cam faces similarly inclined from the length of the rail, and said follower member comprising a yoke for embracing the flanges of said camway member and providing beveled surfaces for engaging the cam faces of said camway member whereby said detector bar is guided positively from and towards normal position.

12. In combination, a detector bar having longitudinal and multi-direction transverse movement relative to the rail; means for guiding said movement comprising a camway member and a follower member, one of which members is secured to the detector bar and the other of which is fixed in position, said camway member comprising a flanged cam face portion having a T cross section and providing cam faces similarly inclined from two angularly disposed planes which are parallel to the length of the rail, said follower member comprising a yoke for embracing the flanges of said camway member and providing surfaces for engaging the cam faces of said camway member whereby said detector bar is guided positively from and towards normal position.

13. In combination, a detector bar having longitudinal and transverse movement relative to the rail; means for guiding said movement comprising a camway member secured to the detector bar and a follower member fixed in position, said camway member comprising a flanged cam face portion having an inverted T cross section and providing cam faces similarly inclined from the length of the rail, and said follower member comprising a yoke for embracing the flanges of said camway member and providing surfaces for engaging the cam faces of said camway member whereby said detector bar is guided positively from and towards normal position.

14. In combination, a detector bar having longitudinal and multi-direction transverse movement relative to the rail; means for guiding said movement comprising a camway member secured to the detector bar and a follower member fixed in position, said camway member comprising a flanged cam face portion having an inverted T cross section and providing cam faces similarly inclined from two angularly disposed planes which are parallel to the length of the rail, and said follower member comprising a yoke for embracing the flanges of said camway member and providing surfaces for engaging the cam faces of said camway member whereby said detector bar is guided positively from and towards normal position.

15. In combination, a detector bar having longitudinal and transverse movement relative to the rail; means for guiding said movement comprising a camway member and a follower member, one of which members is secured to the detector bar and the other of which is fixed in position, said camway member comprising a flanged cam face portion having a T cross section and providing cam faces similarly inclined from the length of the rail, and said follower member comprising a yoke for embracing the flanges of said camway member and providing surfaces, one of which is a roller surface, for engaging the cam faces of said camway member whereby said detector bar is guided positively from and towards normal position.

16. In combination, a detector bar having longitudinal and multi-direction transverse movement relative to the rail; means for guiding said movement comprising a camway member secured to the detector bar and a follower member fixed in position, said camway member comprising a flanged cam face portion having an inverted T cross section and providing cam faces similarly inclined from two angularly disposed planes which are parallel to the length of the rail, and said follower member comprising a yoke for embracing the flanges of said camway member and providing surfaces, one of which is a roller surface, for engaging the cam faces of said camway member whereby said detector bar is guided positively from and to normal position and whereby misplacement of said detector bar is prevented.

17. A detector bar designed and adapted to move into two detecting positions, one detecting position being against the tread of a wheel and another detecting position being against the side face of a wheel, and means for guiding the bar in said movement comprising a camway member secured to the detector bar and providing one or more cam faces and said means also comprising a follower member fixed in position for coöperating with said one or more cam faces.

18. A detector bar designed and adapted to move into two detecting positions, one detecting position being against the tread of a wheel and another detecting position being against the side face of a wheel, and means for guiding the bar in said movement comprising a camway member secured to the detector bar and providing one or more cam faces and said means also comprising a follower member fixed in position for coöperating with said one or more cam faces; and means for preventing displacement of said detector bar.

19. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising a portion providing a cam face secured to said detector bar to move therewith, and said means also comprising a follower part fixed in position for operatively engaging said cam face; and means for preventing displacement of said detector bar.

20. In combination, a detector bar having transverse movement relative to the rail in the movement of said bar from normal to detecting position, and means for guiding said transverse movement so that the wheel engaging edge of said detector bar shall have an upward and inward multi-direction movement transverse to the rail, said means for guiding comprising means for imparting an upward movement to said edge and means for imparting a subsequent inward movement to said edge, one of said last two means comprising a portion providing a cam face secured to said detector bar to move therewith, and said means also comprising a follower part fixed in position for operatively engaging said cam face; and means for preventing displacement of said detector bar.

21. A detector bar designed and adapted to move into two detecting positions, one detecting position being against the tread of a wheel and another detecting position being against the side face of a wheel, means comprising a cam face for guiding said bar into its detecting position against the tread of a wheel, and means comprising a cam face for guiding said bar into its detecting position against the side face of a wheel, one at least of said means being secured to said detector bar.

22. A detector bar designed and adapted to move into two detecting positions, one detecting position being against the tread of a wheel and another detecting position being against the side face of a wheel, means comprising a cam face secured to said detector bar for guiding said bar into its detecting position against the tread of a wheel, and means comprising a cam face for guiding said bar into its detecting position against the side face of a wheel.

23. A detector bar designed and adapted to move into two detecting positions, one detecting position being against the tread of a wheel and another detecting position being against the side face of a wheel, means comprising a cam face for guiding said bar into its detecting position against the tread of a wheel, and means comprising a cam face secured to said detector bar for guiding said bar into its detecting position against the side face of a wheel.

24. A detector bar designed and adapted to move into two detecting positions, one detecting position being against the tread of a wheel and another detecting position being against the side face of a wheel, means comprising a cam face for guiding said bar into its detecting position against the tread of a wheel, and means comprising a cam face for guiding said bar into its detecting position against the side face of a wheel, both of said means being secured to said detector bar.

25. A cam-way member for detector bars having an inclined cam face on its edge to guide a detector bar upward, and a cam face on its side to guide said detector bar inward.

26. A cam-way member for detector bars having an oppositely-inclined cam face on its edge to guide a detector bar upward and downward, and an oppositely-inclined cam face on its side to guide said detector bar inward and outward.

27. A longitudinally moving detector bar designed and adapted to move into two detecting positions, one detecting position being against the tread of a wheel and another detecting position being against the side face of a wheel, means comprising a cam face for guiding said bar into its detecting position against the tread of a wheel, and means comprising a cam face for guiding said bar into its detecting position against the side face of a wheel, one at least of said means being secured to said detector bar.

28. A longitudinally moving detector bar designed and adapted to move into two detecting positions, one detecting position being against the tread of a wheel and another detecting position being against the side face of a wheel, means comprising a cam face for guiding said bar into its detecting position against the tread of a wheel, and means comprising a cam face for guiding said bar into its detecting position against the side face of a wheel, both of said means being secured to said detector bar.

29. A longitudinally moving detector bar designed and adapted to move into two detecting positions, one detecting position being against the tread of a wheel, means comprising a cam face for guiding said bar into and out of its detecting position against the tread of a wheel, and means comprising a cam face for guiding said bar into and out of its detecting position against the side face of a wheel, one at least of said means being secured to said detector bar.

30. A longitudinally moving detector bar designed and adapted to move into two detecting positions, one detecting position being against the tread of a wheel and another detecting position being against the side face of a wheel, means comprising a cam face for guiding said bar into and out of its detecting position against the tread of a wheel, and means comprising a cam face for guiding said bar into and out of its detecting position against the side face of a wheel, both of said means being secured to said detector bar.

In testimony whereof, I have signed my name to this specification, in the presence of two subscribing witnesses.

CASPER HERRINGER.

Witnesses:
BEATRICE MIRVIS,
IDA G. GILMORE.